United States Patent
Chan et al.

(10) Patent No.: US 9,513,527 B2
(45) Date of Patent: Dec. 6, 2016

(54) COLOR DISPLAY DEVICE

(71) Applicant: E Ink California, LLC, Fremont, CA (US)

(72) Inventors: Bryan Hans Chan, San Francisco, CA (US); Hui Du, Milpitas, CA (US); Craig Lin, Oakland, CA (US); HongMei Zang, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 14/596,160

(22) Filed: Jan. 13, 2015

(65) Prior Publication Data

US 2015/0198858 A1 Jul. 16, 2015

Related U.S. Application Data

(60) Provisional application No. 61/927,418, filed on Jan. 14, 2014.

(51) Int. Cl.
*G02B 26/00* (2006.01)
*G09G 3/34* (2006.01)
*G02F 1/167* (2006.01)

(52) U.S. Cl.
CPC .............. *G02F 1/167* (2013.01); *G09G 3/344* (2013.01); *G02F 2001/1678* (2013.01)

(58) Field of Classification Search
CPC ................ G02F 1/167; G02F 9/372; G02F 2001/1678; G09G 3/344
USPC ............ 359/296; 345/107; 430/32; 204/600
See application file for complete search history.

(56) References Cited

U.S. PATENT DOCUMENTS

| 3,756,693 | A | 9/1973 | Ota |
| 3,892,568 | A | 7/1975 | Ota |
| 4,298,448 | A | 11/1981 | Muller et al. |
| 5,378,574 | A | 1/1995 | Winnik et al. |
| 5,980,719 | A | 11/1999 | Cherukuri et al. |
| 6,198,809 | B1 | 3/2001 | Disanto et al. |
| 6,337,761 | B1 | 1/2002 | Rogers et al. |
| 6,373,461 | B1 | 4/2002 | Hasegawa et al. |
| 6,486,866 | B1 | 11/2002 | Kuwahara et al. |
| 6,517,618 | B2 | 2/2003 | Foucher et al. |

(Continued)

FOREIGN PATENT DOCUMENTS

| CN | 1705907 | 12/2005 |
| JP | 2006-343458 | 12/2006 |

(Continued)

OTHER PUBLICATIONS

Patent Cooperation Treaty, PCT/US2015/011237, PCT Notification of Transmittal of the International Search Report and the Written Opinion of the International Searching Authority, or the Declaration, Date of Mailing Apr. 10, 2015.

(Continued)

*Primary Examiner* — William Choi
(74) *Attorney, Agent, or Firm* — David J. Cole

(57) ABSTRACT

The present invention provides a full color display device in which each pixel can display multiple high-quality color states. More specifically, an electrophoretic fluid is provided which comprises four types of particles, dispersed in a solvent or solvent mixture and each pixel can display at least five different color states.

19 Claims, 16 Drawing Sheets

(56) References Cited

U.S. PATENT DOCUMENTS

| | | |
|---|---|---|
| 6,525,866 B1 | 2/2003 | Lin et al. |
| 6,538,801 B2 | 3/2003 | Jacobson et al. |
| 6,600,534 B1 | 7/2003 | Tanaka et al. |
| 6,650,462 B2 | 11/2003 | Katase |
| 6,680,726 B2 | 1/2004 | Gordon et al. |
| 6,693,620 B1 | 2/2004 | Herb et al. |
| 6,704,133 B2 | 3/2004 | Gates et al. |
| 6,724,521 B2 | 4/2004 | Nakao et al. |
| 6,729,718 B2 | 5/2004 | Goto et al. |
| 6,751,007 B2 | 6/2004 | Liang et al. |
| 6,751,008 B2 | 6/2004 | Liang et al. |
| 6,781,745 B2 | 8/2004 | Chung et al. |
| 6,829,078 B2 | 12/2004 | Liang et al. |
| 6,850,357 B2 | 2/2005 | Kaneko et al. |
| 6,864,875 B2 | 3/2005 | Drzaic et al. |
| 6,876,486 B2 | 4/2005 | Hiraoka et al. |
| 6,930,818 B1 | 8/2005 | Liang et al. |
| 6,947,203 B2 | 9/2005 | Kanbe |
| 6,967,762 B2 | 11/2005 | MacHida et al. |
| 6,987,503 B2 | 1/2006 | Inoue |
| 6,987,605 B2 | 1/2006 | Liang et al. |
| 7,009,756 B2 | 3/2006 | Kishi et al. |
| 7,019,889 B2 | 3/2006 | Katase |
| 7,034,987 B2 | 4/2006 | Schlangen |
| 7,038,655 B2 | 5/2006 | Herb et al. |
| 7,038,670 B2 | 5/2006 | Liang et al. |
| 7,046,228 B2 | 5/2006 | Liang et al. |
| 7,050,218 B2 | 5/2006 | Kanbe |
| 7,057,600 B2 | 6/2006 | Goden |
| 7,057,798 B2 | 6/2006 | Ukigaya |
| 7,075,502 B1 | 7/2006 | Drzaic et al. |
| 7,116,466 B2 | 10/2006 | Whitesides et al. |
| 7,226,550 B2 | 6/2007 | Hou et al. |
| 7,259,744 B2 | 8/2007 | Arango et al. |
| 7,271,947 B2 | 9/2007 | Liang et al. |
| 7,283,119 B2 | 10/2007 | Kishi |
| 7,292,386 B2 | 11/2007 | Kanbe |
| 7,303,818 B2 | 12/2007 | Minami |
| 7,304,987 B1 | 12/2007 | Schlangen |
| 7,312,916 B2 | 12/2007 | Pullen et al. |
| 7,342,556 B2 | 3/2008 | Oue et al. |
| 7,345,810 B2 | 3/2008 | Chopra et al. |
| 7,352,353 B2 | 4/2008 | Albert et al. |
| 7,365,732 B2 | 4/2008 | Matsuda et al. |
| 7,382,351 B2 | 6/2008 | Kishi |
| 7,411,719 B2 | 8/2008 | Paolini et al. |
| 7,417,787 B2 | 8/2008 | Chopra et al. |
| 7,420,549 B2 | 9/2008 | Jacobson et al. |
| 7,433,113 B2 | 10/2008 | Chopra et al. |
| 7,474,295 B2 | 1/2009 | Matsuda |
| 7,492,505 B2 | 2/2009 | Liang et al. |
| 7,495,821 B2 | 2/2009 | Yamakita et al. |
| 7,502,162 B2 | 3/2009 | Lin et al. |
| 7,545,557 B2 | 6/2009 | Iftime et al. |
| 7,548,291 B2 | 6/2009 | Lee et al. |
| 7,557,981 B2 | 7/2009 | Liang et al. |
| 7,580,025 B2 | 8/2009 | Nakai et al. |
| 7,605,972 B2 | 10/2009 | Kawai et al. |
| 7,609,435 B2 | 10/2009 | Moriyama et al. |
| 7,626,185 B2 | 12/2009 | Krak et al. |
| 7,636,076 B2 | 12/2009 | Hung et al. |
| 7,652,656 B2 | 1/2010 | Chopra et al. |
| 7,656,576 B2 | 2/2010 | Suwabe et al. |
| 7,679,599 B2 | 3/2010 | Kawai |
| 7,686,463 B2 | 3/2010 | Goto |
| 7,760,419 B2 | 7/2010 | Lee |
| 7,782,292 B2 | 8/2010 | Miyasaka et al. |
| 7,808,696 B2 | 10/2010 | Lee et al. |
| 7,830,592 B1 | 11/2010 | Sprague et al. |
| 7,848,009 B2 | 12/2010 | MacHida et al. |
| 7,852,547 B2 | 12/2010 | Kim |
| 7,852,548 B2 | 12/2010 | Roh |
| 7,907,327 B2 | 3/2011 | Jang et al. |
| 7,911,681 B2 | 3/2011 | Ikegami et al. |
| 7,982,941 B2 | 7/2011 | Lin et al. |
| 8,040,594 B2 | 10/2011 | Paolini et al. |
| 8,067,305 B2 | 11/2011 | Zafiropoulo et al. |
| 8,072,675 B2 | 12/2011 | Lin et al. |
| 8,081,375 B2 | 12/2011 | Komatsu et al. |
| 8,089,686 B2 | 1/2012 | Addington et al. |
| 8,115,729 B2 | 2/2012 | Danner et al. |
| 8,120,838 B2 | 2/2012 | Lin et al. |
| 8,159,636 B2 | 4/2012 | Sun et al. |
| 8,164,823 B2 | 4/2012 | Ikegami et al. |
| 8,169,690 B2 | 5/2012 | Lin et al. |
| 8,174,492 B2 | 5/2012 | Kim et al. |
| 8,237,892 B1 | 8/2012 | Sprague et al. |
| 8,243,013 B1 | 8/2012 | Sprague et al. |
| 8,355,196 B2 | 1/2013 | Yan et al. |
| 8,395,836 B2 | 3/2013 | Lin et al. |
| 8,422,116 B2 | 4/2013 | Sprague et al. |
| 8,441,713 B2 | 5/2013 | Kawashima et al. |
| 8,441,714 B2 | 5/2013 | Paolini et al. |
| 8,466,852 B2 | 6/2013 | Drzaic et al. |
| 8,477,404 B2 | 7/2013 | Moriyama et al. |
| 8,477,405 B2 | 7/2013 | Ishii et al. |
| 8,503,063 B2 | 8/2013 | Sprague |
| 8,520,296 B2 | 8/2013 | Wang et al. |
| 8,537,104 B2 | 9/2013 | Markvoort et al. |
| 8,565,522 B2 | 10/2013 | Swic |
| 8,570,272 B2 | 10/2013 | Hsieh et al. |
| 8,570,639 B2 | 10/2013 | Masuzawa et al. |
| 8,574,937 B2 | 11/2013 | Shi |
| 8,605,354 B2 | 12/2013 | Zhang et al. |
| 8,610,998 B2 | 12/2013 | Baisch et al. |
| 8,629,832 B2 | 1/2014 | Tanabe |
| 8,649,084 B2 | 2/2014 | Wang et al. |
| 8,670,174 B2 | 3/2014 | Sprague et al. |
| 8,674,978 B2 | 3/2014 | Komatsu et al. |
| 8,681,191 B2 | 3/2014 | Yang et al. |
| 8,687,265 B2 | 4/2014 | Ahn et al. |
| 8,704,754 B2 | 4/2014 | MacHida et al. |
| 8,704,756 B2 | 4/2014 | Lin |
| 8,717,662 B2 | 5/2014 | Komatsu |
| 8,717,664 B2 | 5/2014 | Wang et al. |
| 8,786,935 B2 | 7/2014 | Sprague |
| 8,797,258 B2 | 8/2014 | Sprague |
| 8,797,636 B2 | 8/2014 | Yang et al. |
| 8,797,637 B2 | 8/2014 | Fujishiro et al. |
| 8,810,899 B2 | 8/2014 | Sprague et al. |
| 8,902,491 B2 | 12/2014 | Wang et al. |
| 8,917,439 B2 | 12/2014 | Wang et al. |
| 8,964,282 B2 | 2/2015 | Wang et al. |
| 9,052,564 B2 | 6/2015 | Sprague et al. |
| 2001/0035926 A1 | 11/2001 | Yamaguchi et al. |
| 2004/0085619 A1 | 5/2004 | Wu et al. |
| 2007/0002008 A1 | 1/2007 | Tam |
| 2007/0080928 A1 | 4/2007 | Ishii et al. |
| 2007/0273637 A1 | 11/2007 | Zhou et al. |
| 2008/0042928 A1 | 2/2008 | Schlangen et al. |
| 2008/0062159 A1 | 3/2008 | Roh et al. |
| 2008/0117165 A1 | 5/2008 | MacHida et al. |
| 2008/0174531 A1 | 7/2008 | Ash |
| 2009/0153942 A1 | 6/2009 | Daniel et al. |
| 2009/0184897 A1 | 7/2009 | Miyamoto |
| 2009/0311484 A1 | 12/2009 | McLellan et al. |
| 2010/0103502 A1 | 4/2010 | Jacobson et al. |
| 2010/0283804 A1 | 11/2010 | Sprague et al. |
| 2011/0043543 A1 | 2/2011 | Chen et al. |
| 2011/0175939 A1 | 7/2011 | Moriyama et al. |
| 2011/0199671 A1 | 8/2011 | Amundson et al. |
| 2011/0217639 A1 | 9/2011 | Sprague |
| 2011/0234557 A1 | 9/2011 | Yang et al. |
| 2011/0261433 A1 | 10/2011 | Sprague et al. |
| 2012/0194899 A1 | 8/2012 | Zhang |
| 2012/0299947 A1 | 11/2012 | Tsuda et al. |
| 2013/0278995 A1 | 10/2013 | Drzaic et al. |
| 2013/0300727 A1 | 11/2013 | Lin et al. |
| 2014/0011913 A1 | 1/2014 | Du et al. |
| 2014/0055840 A1 | 2/2014 | Zang et al. |
| 2014/0078036 A1 | 3/2014 | Zhang et al. |
| 2014/0078576 A1 | 3/2014 | Sprague |
| 2014/0313566 A1 | 10/2014 | Du et al. |
| 2014/0340735 A1 | 11/2014 | Lin et al. |

(56) References Cited

U.S. PATENT DOCUMENTS

| | | |
|---|---|---|
| 2014/0340736 A1 | 11/2014 | Lin |
| 2014/0340737 A1 | 11/2014 | Sprague |
| 2014/0347407 A1 | 11/2014 | Wang et al. |
| 2015/0103394 A1 | 4/2015 | Wang et al. |

FOREIGN PATENT DOCUMENTS

| | | |
|---|---|---|
| JP | 2007033710 | 2/2007 |
| JP | 2008-033000 | 2/2008 |
| JP | 2008-209589 | 9/2008 |
| JP | 2009116041 | 5/2009 |
| JP | 2009192637 | 8/2009 |
| JP | 2011158783 | 8/2011 |
| KR | 10-2007-0082680 | 8/2007 |
| KR | 10-2008-0023913 | 3/2008 |
| KR | 10-2011-0103765 | 9/2011 |
| TW | 201122697 | 7/2011 |
| TW | 201237529 | 9/2012 |
| WO | WO 99/53373 | 10/1999 |
| WO | WO 03/016993 | 2/2003 |
| WO | WO 2010/027810 A1 | 3/2010 |

OTHER PUBLICATIONS

U.S. Appl. No. 14/794,689, filed Jul. 8, 2015, Chan et al.
U.S. Appl. No. 14/921,265, filed Oct. 23, 2015, Craig Lin et al.
U.S. Appl. No. 14/242,793, filed Apr. 1, 2014, Wang et al.
U.S. Appl. No. 14/596,160, filed Jan. 13, 2015, Chan et al.
U.S. Appl. No. 14/626,552, filed Feb. 19, 2015, Lin et al.
U.S. Appl. No. 14/629,369, filed Feb. 23, 2015, Du et al.
KAWAGUCHI_DesignedMonomersPolymers_2000_3_3_pp. 263.

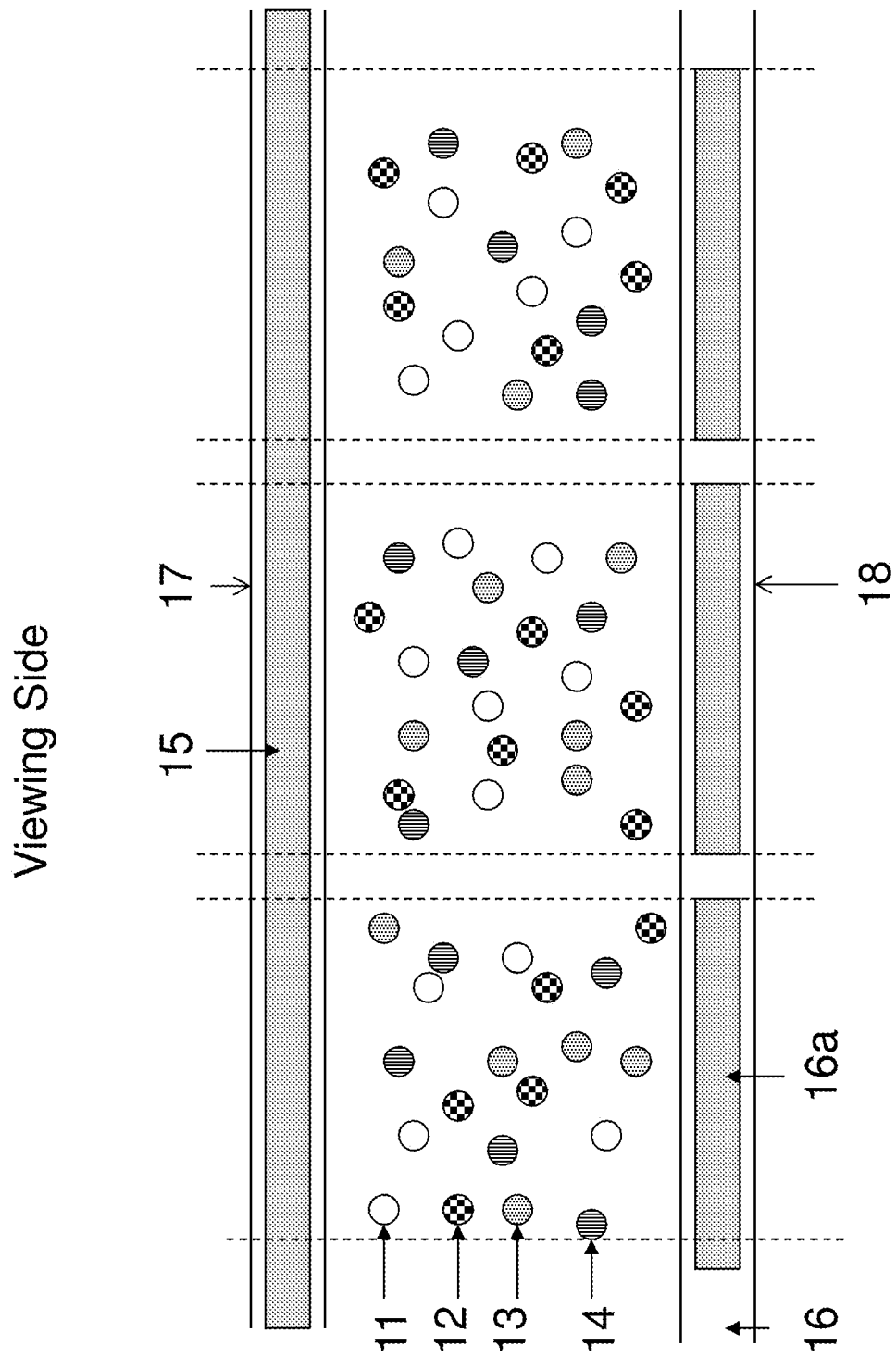

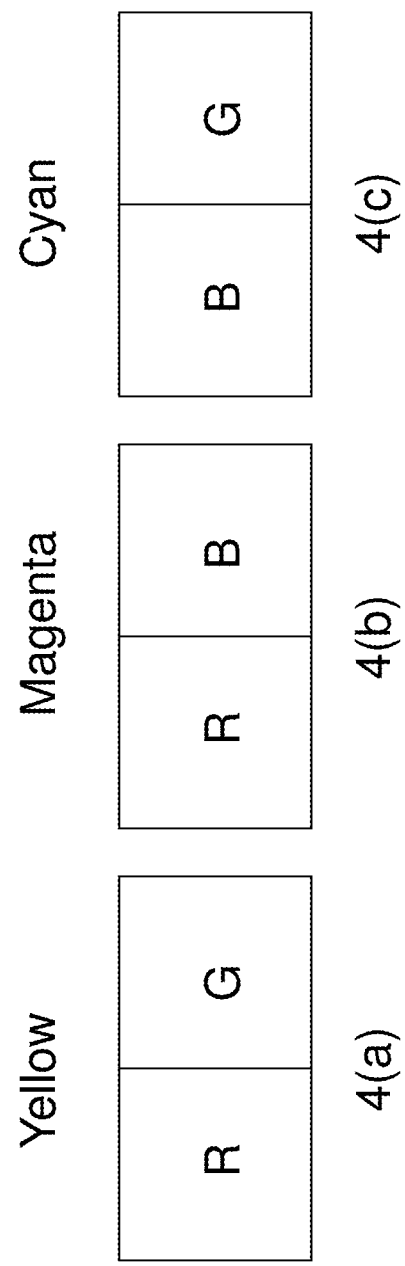

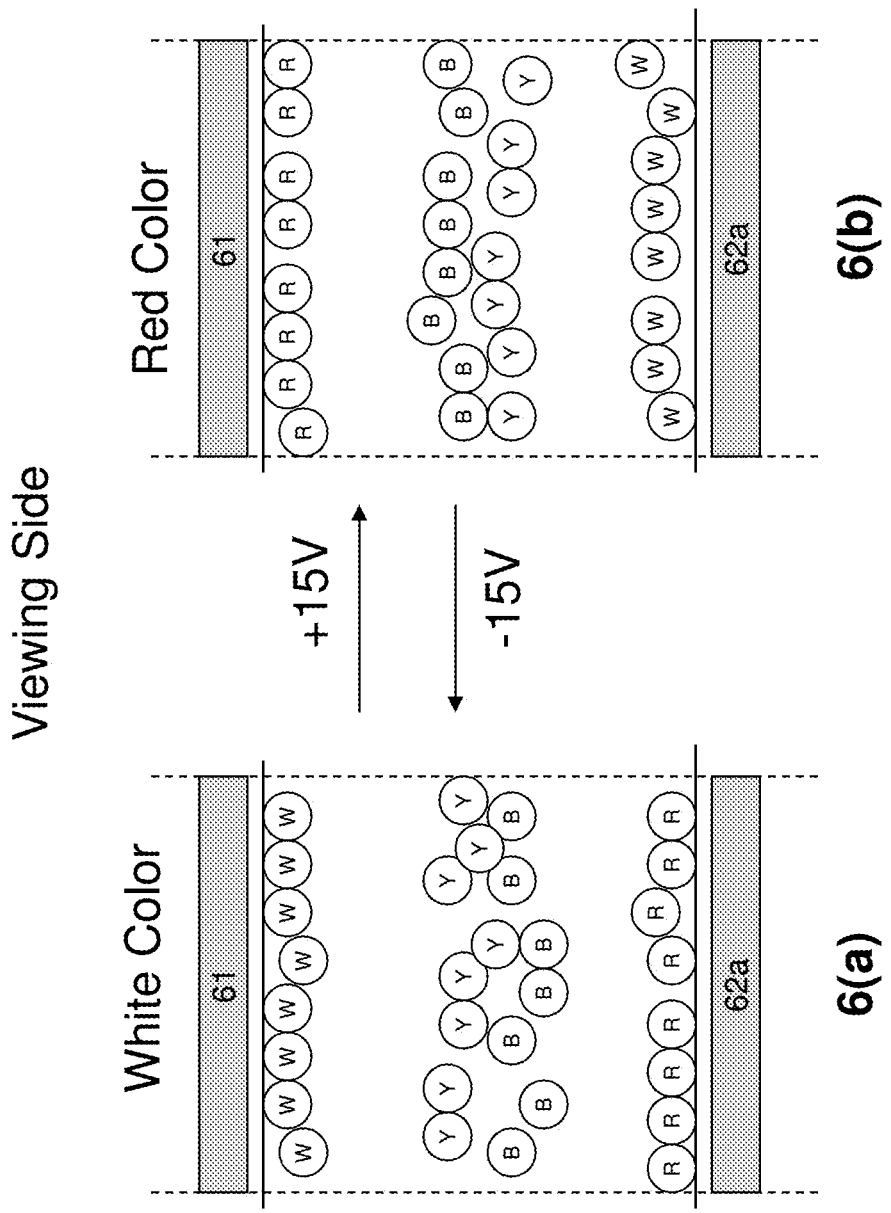

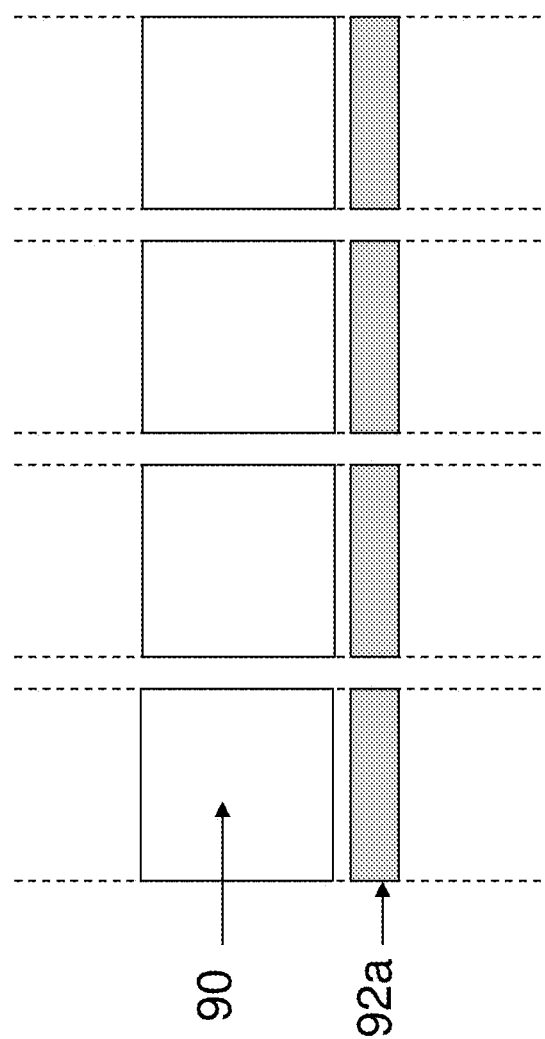

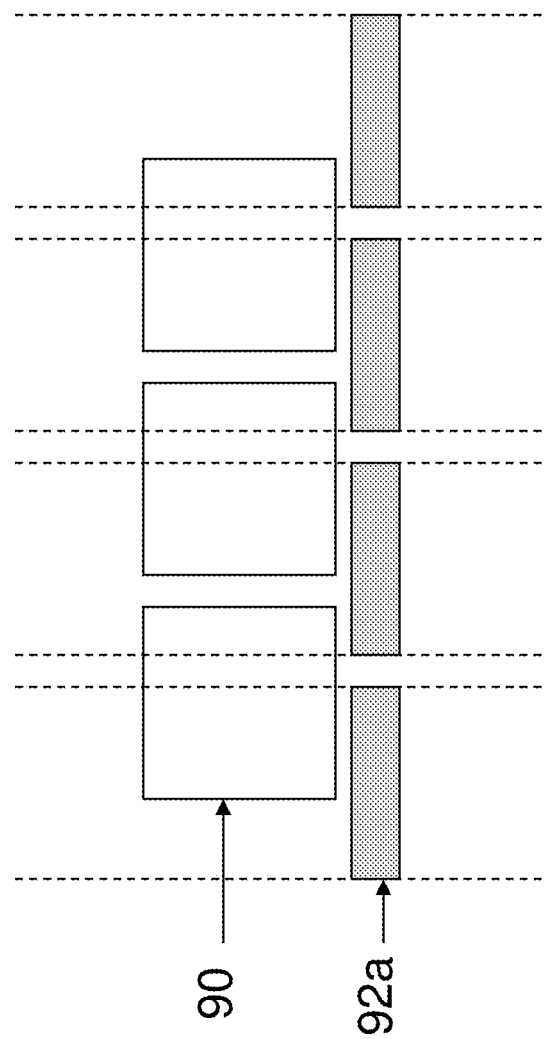

US 9,513,527 B2

COLOR DISPLAY DEVICE

This application claims the benefit of U.S. Provisional Application No. 61/927,418, filed on Jan. 14, 2014, which is incorporated by reference in its entirety.

FIELD OF THE INVENTION

The present invention is directed to a full color display device in which each pixel can display multiple high-quality color states, and an electrophoretic fluid for such an electrophoretic display.

BACKGROUND OF THE INVENTION

In order to achieve a color display, color filters are often used. The most common approach is to add color filters on top of black/white sub-pixels of a pixellated display to display the red, green and blue colors. When a red color is desired, the green and blue sub-pixels are turned to the black state so that the only color displayed is red. When a green color is desired, the red and blue sub-pixels are turned to the black state so that the only color displayed is green. When a blue color is desired, the green and red sub-pixels are turned to the black state so that the only color displayed is blue. When the black state is desired, all three-sub-pixels are turned to the black state. When the white state is desired, the three sub-pixels are turned to red, green and blue, respectively, and as a result, a white state is seen by the viewer.

The biggest disadvantage of such a technique is that since each of the sub-pixels has a reflectance of about one third of the desired white state, the white state is fairly dim. To compensate this, a fourth sub-pixel may be added which can display only the black and white states, so that the white level is doubled at the expense of the red, green or blue color level (where each sub-pixel is only one fourth of the area of the pixel). Brighter colors can be achieved by adding light from the white pixel, but this is achieved at the expense of color gamut to cause the colors to be very light and unsaturated. A similar result can be achieved by reducing the color saturation of the three sub-pixels. Even with this approach, the white level is normally substantially less than half of that of a black and white display, rendering it an unacceptable choice for display devices, such as e-readers or displays that need well readable black-white brightness and contrast.

BRIEF DISCUSSION OF THE DRAWINGS

FIG. 1 depicts an electrophoretic display device of the present invention.

FIGS. 2-1 to 2-4 illustrate an example of the present invention.

FIG. 3 shows a shaking waveform.

FIGS. 4 and 5 show how yellow, magenta and cyan color states may be displayed by a display device of FIG. 2.

FIGS. 6-1 to 6-4 illustrate another example of the present invention.

Figures 1, 2:
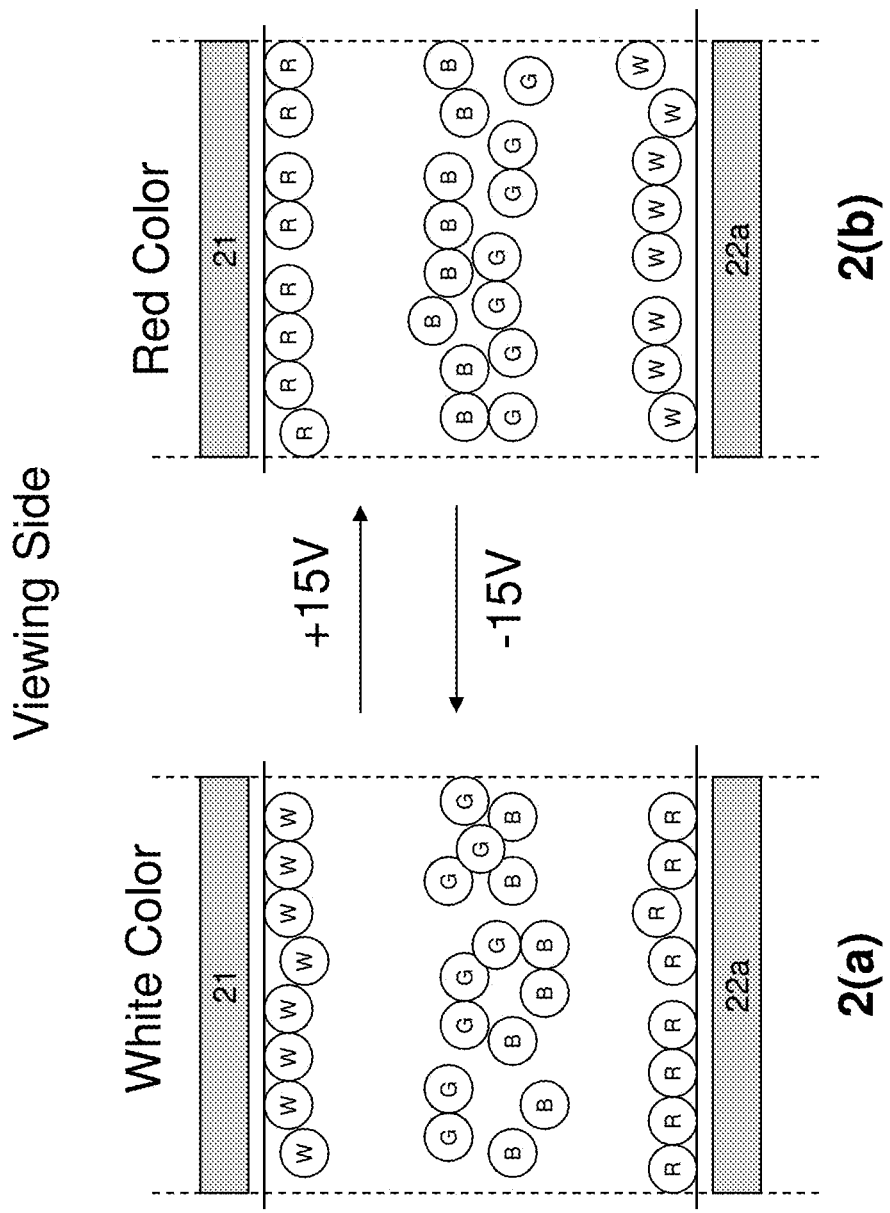
Figure 2:
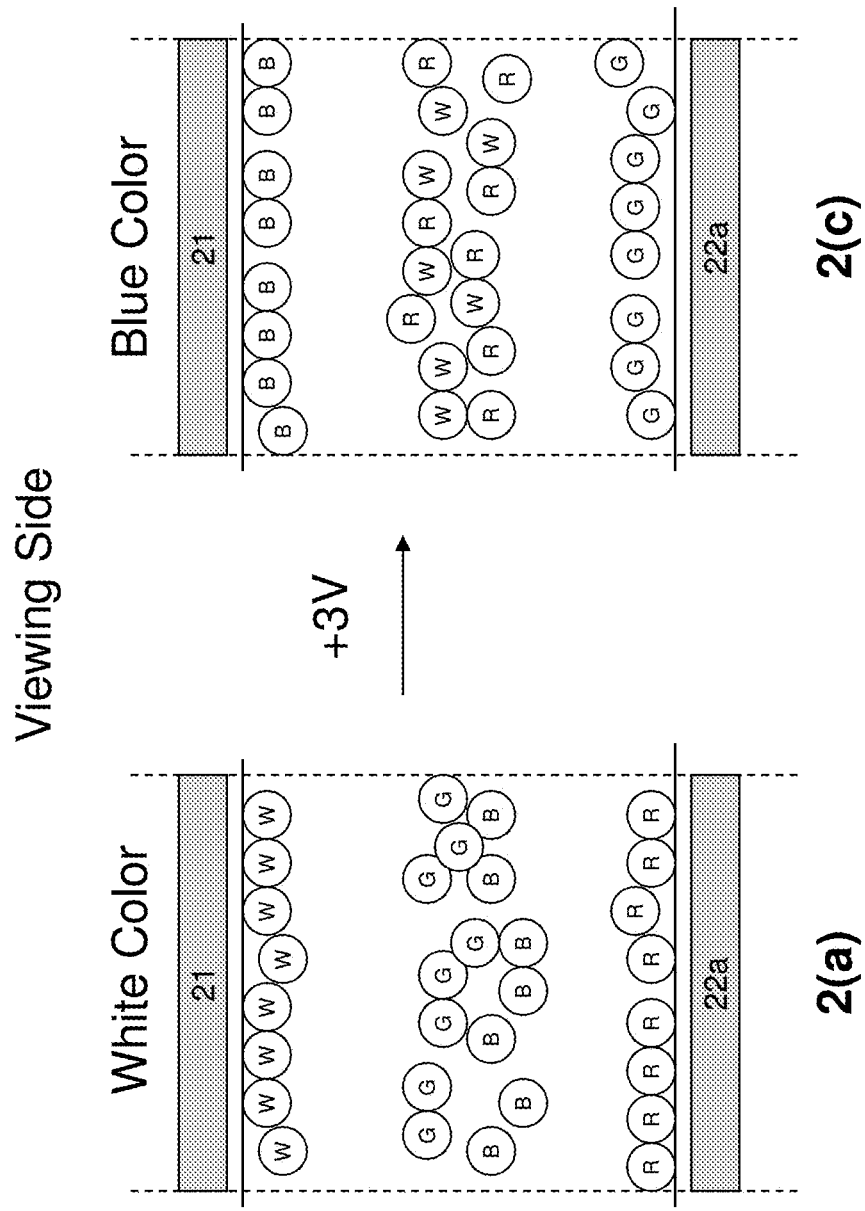

FIGS. 9A and 9B, respectively, demonstrate display cells aligned or unaligned with pixel electrodes.

SUMMARY OF THE INVENTION

One aspect of the present invention is directed to an electrophoretic display, comprising (a) a plurality of pixels; and (b) an electrophoretic fluid in which a first type of particles, a second type of particles, a third type of particles and a fourth type of particles are dispersed in a solvent or solvent mixture and the first and second types of particles carry a high level of charge and are oppositely charged and the third and fourth types of particles carry a low level of charge and are oppositely charged, wherein each of the pixels is capable of displaying at least five different color states.

In one embodiment, the first and second type of articles are of the white and red colors, respectively. In one embodiment, the third and fourth types of particles are of the blue and green colors, respectively. In one embodiment, each of the pixels is capable of displaying white, red, green, blue and black color states. In another embodiment, each of the pixels is capable of displaying yellow, magenta and cyan color states.

In one embodiment, the third and fourth types of particles are of the blue and yellow colors, respectively. In one embodiment, each of the pixels is capable of displaying white, red, yellow, blue and black color states. In one embodiment, each of the pixels is capable of displaying green, orange and purple color states.

In one embodiment, the low level of charge is less than about 50% of the high level of charge. In another embodiment, the low level of charge is less than about 75% of the high level of charge.

In one embodiment, the electrophoretic fluid further comprises substantially uncharged neutral buoyancy particles. In another embodiment, the substantially uncharged neutral buoyancy particles are non-charged.

Another aspect of the present invention is directed to a display layer comprising an electrophoretic fluid and having first and second surfaces on opposed sides thereof, the electrophoretic fluid comprising high positive particles, high negative particles, low positive particles and low negative particles, all dispersed in a solvent or solvent mixture, the four type of particles having respectively optical characteristics differing from one another, such that:

(a) application of an electric field which has the same polarity as the high positive particles will cause the optical characteristics of the high positive particles to be displayed at the first surface; or (b) application of an electric field which has the same polarity as high negative particles will cause the optical characteristic of the high negative particles to be displayed at the first surface; or (c) once the optical characteristic of the high positive particles is displayed at the first surface, application of an electric field which has the same polarity as low negative particles, but is not strong enough to overcome the attraction force between the high positive particles and the high negative particles, but sufficient to overcome the attraction forces between other oppositely charged particles will cause the optical characteristic of the low negative particles to be displayed at the first surface; or (d) once the optical characteristic of the high negative particles is displayed at the first surface, application of an electric field which has the same polarity as the low positive particles, but is not strong enough to overcome the attraction force between the high positive particles and the high negative particles, but sufficient to overcome the attraction forces between other oppositely charged particles will cause the optical characteristic of the low positive particles to be displayed at the first surface; or (e) application of a shaking waveform will cause a fifth optical characteristic to be displayed at the first surface.

In one embodiment of this aspect of the invention, the four types of particles are red, green, blue and white. In another embodiment, the four types of particles are red, yellow, blue and white. In a further embodiment, the four types of particles are cyan, magenta, yellow and white.

In one embodiment, none of the four types of particles is black particles and the fifth optical characteristic is a black color state.

DETAILED DESCRIPTION OF THE INVENTION

The electrophoretic fluid of present invention comprises four types of particles dispersed in a dielectric solvent or solvent mixture. For ease of illustration, the four types of pigment particles may be referred to as the first type (11), the second type (12), the third type (13) and the fourth type (14) of particles, as shown in FIG. 1. However, with only four types of pigment particles, a display device utilizing the electrophoretic fluid may display at least five different color states, which leads to a full color display.

Generally, the four types of particles are divided into two groups—high charge group and low charge group. In the two groups of oppositely charged particles, one group carries a stronger charge than the other group. Therefore the four types of pigment particles may also be referred to as high positive particles, high negative particles, low positive particles and low negative particles.

As an example, red particles (R) and white particles (W) may be the first group of oppositely charged particles, and in this group, the red particles are the high positive particles and the white particles are the high negative particles. The blue particles (B) and the green particles (G) may be the second group of oppositely charged particles and in this group, the blue particles are the low positive particles and the green particles are the low negative particles.

In another example, red particles may be the high positive particles; white particles may be the high negative particles; blue particles may be the low positive particles and yellow particles may be the low negative particles.

It is understood that the scope of the invention broadly encompasses particles of any colors as long as the four types of particles have visually distinguishable colors.

For the white particles, they may be formed from an inorganic pigment, such as $TiO_2$, $ZrO_2$, $ZnO$, $Al_2O_3$, $Sb_2O_3$, $BaSO_4$, $PbSO_4$ or the like.

For the black particles, if present, they may be formed from CI pigment black 26 or 28 or the like (e.g., manganese ferrite black spinel or copper chromite black spinel) or carbon black.

Particles of other colors (non-white and non-black) are independently of a color such as red, green, blue, magenta, cyan or yellow. The pigments for color particles may include, but are not limited to, CI pigment PR 254, PR122, PR149, PG36, PG58, PG7, PB28, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

The non-black and non-white color particles may also be inorganic pigments, such as red, green, blue and yellow pigments. Examples may include, but are not limited to, CI pigment blue 28, CI pigment green 50 and CI pigment yellow 227.

In addition to the colors, the four types of particles may have other distinct optical characteristics, such as optical transmission, reflectance, luminescence or, in the case of displays intended for machine reading, pseudo-color in the sense of a change in reflectance of electromagnetic wavelengths outside the visible range.

As also shown in FIG. 1, a display layer utilizing the display fluid of the present invention has two surfaces, a first surface (17) on the viewing side and a second surface (18) on the opposite side of the first surface (17). The display fluid is sandwiched between the two surfaces. On the side of the first surface (17), there is a common electrode (15) which is a transparent electrode layer (e.g., ITO), spreading over the entire top of the display layer. On the side of the second surface (18), there is an electrode layer (16) which comprises a plurality of pixel electrodes (16a).

The pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

Each space between two dotted vertical lines in FIG. 1 denotes a pixel. As shown, each pixel has a corresponding pixel electrode. An electric field is created for a pixel by the potential difference between a voltage applied to the common electrode and a voltage applied to the corresponding pixel electrode.

The percentages of the four types of particles in the fluid may vary. For example, one type of particles may take up 0.1% to 50%, preferably 0.5% to 15%, by volume of the electrophoretic fluid.

The solvent in which the four types of particles are dispersed is clear and colorless. It preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-corning (DC-200).

In one embodiment, the charge carried by the "low charge" particles may be less than about 50%, or about 5% to about 30%, of the charge carried by the "high charge" particles. In another embodiment, the "low charge" particles may be less than about 75%, or about 15% to about 55%, the charge carried by the "high charge" particles. In a further embodiment, the comparison of the charge levels as indicated applies to two types of particles having the same charge polarity.

The charge intensity may be measured in terms of zeta potential. In one embodiment, the zeta potential is determined by Colloidal Dynamics AcoustoSizer IIM with a CSPU-100 signal processing unit, ESA EN# Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to between 5-10% by weight. The sample also contains a charge control agent (Solsperse 17000®, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow through cell for determination of the zeta potential.

The magnitudes of the "high positive" particles and the "high negative" particles may be the same or different. Likewise, the magnitudes of the "low positive" particles and the "low negative" particles may be the same or different.

It is also noted that in the same fluid, the two groups of high-low charge particles may have different levels of charge differentials. For example, in one group, the low positively charged particles may have a charge intensity which is 30% of the charge intensity of the high positively charged particles and in another group, the low negatively charged particles may have a charge intensity which is 50% of the charge intensity of the high negatively charged particles.

The charge polarities and levels of charge for the particles may be tuned, according to the method described in US Publication No. 2014-0011913, the contents of which are incorporated herein by reference in its entirety.

It is also noted that the four types of particles may have different particle sizes. For example, smaller particles may have a size which ranges from about 50 nm to about 800 nm. Larger particles may have a size which is about 2 to about 50 times, and more preferably about 2 to about 10 times, the sizes of the smaller particles.

EXAMPLE 1

This example is demonstrated in FIG. 2. The fluid in this example has red, green, blue and white pigment particles. The red particles (R) carry a high positive charge, the white particles (W) carry a high negative charge, the blue (B) particles carry a low positive charge and the green particles (G) carry a low negative charge.

In FIG. 2(a), when a high negative voltage potential difference (e.g., −15V) is applied to a pixel, the white particles (W) are pushed to the common electrode (21) side and the red particles (R) are pulled to the pixel electrode (22a) side. The blue (B) and green (G) particles, due to their lower charge level, move slower than the higher charged white and red particles and therefore they stay in the middle of the pixel, with green particles above the blue particles. As a result, the white color is seen at the viewing side.

In FIG. 2(b), when a high positive voltage potential difference (e.g., +15V) is applied to the pixel, the particle distribution would be opposite of that shown in FIG. 2(a) and as a result, the red color is seen at the viewing side.

In FIG. 2(c), when a lower positive voltage potential difference (e.g., +3V) is applied to the pixel of FIG. 2(a) (that is, driven from the white state), the white particles (W) move towards the pixel electrode (22a) while the red particles (R) move towards the common electrode (21). When they meet while moving, because of their strong attraction to each other, they stop moving and remain in the middle of the pixel. In other words, the electric field generated by the low positive voltage potential difference is not strong enough to separate the white and red particles.

However, the electric field is strong enough to separate the lower charged blue and green particles and also strong enough to overcome the attraction forces between the oppositely charged high-low particle pairs (white/blue and red/green). As a result, the lower charged (positive) blue particles (B) move all the way to the common electrode (21) side (i.e., the viewing side) and the lower charged (negative) green particles (G) move to the pixel electrode (22a) side. Consequently, the blue color is seen at the viewing side.

In FIG. 2(d), when a lower negative voltage potential difference (e.g., −3V) is applied to the pixel of FIG. 2(b) (that is, driven from the red state), the red particles (R) move towards the pixel electrode (22a) while the white particles (W) move towards the common electrode (21). When the white and red particles meet, because of their strong attraction to each other, they stop moving and remain in the middle of the pixel. In other words, the electric field generated by the low negative voltage potential difference is not strong enough to separate the white and red particles.

However, the electric field is strong enough to separate the lower charged blue and green particles and also strong enough to overcome the attraction forces between the oppositely charged high-low particle pairs (white/blue and red/green). As a result, the lower charged (negative) green particles (G) move all the way to the common electrode side (i.e., the viewing side) and the lower charged (positive) blue particles (B) move to the pixel electrode side. Consequently, the green color is seen at the viewing side.

In FIG. 2(e), a black color is seen from the viewing side. This may be achieved by applying a shaking waveform when a pixel is in the red color state (seen in FIG. 2b) to cause the red, green and blue particles to be mixed in the upper part of the pixel, leading to the black state to be seen at the viewing side.

Figures 2, 3:
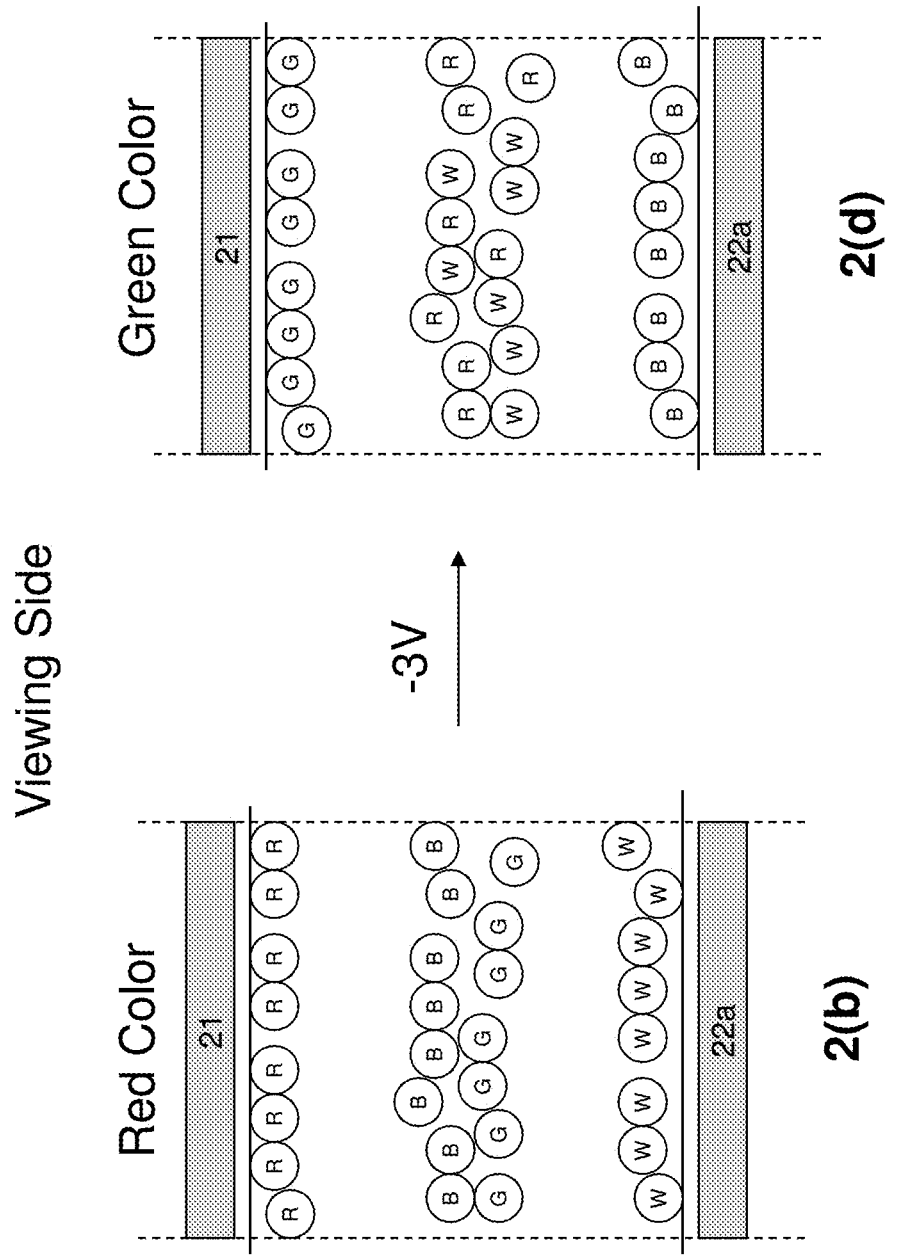

A shaking waveform consists of repeating a pair of opposite driving pulses for many cycles. For example, the shaking waveform may consist of a +15V pulse for 20 msec and a −15V pulse for 20 msec and such a pair of pulses is repeated for 50 times. The total time of such a shaking waveform would be 2000 msec (see FIG. 3).

In practice, there may be at least 10 repetitions (i.e., ten pairs of positive and negative pulses).

After the shaking waveform is applied, the optical state would be from a mixture of the particles, seen to be black in the present example.

Each of the driving pulse in the shaking waveform is applied for not exceeding 50% (or not exceeding 30%, 10% or 5%) of the driving time required from the full white state to the full red state in the example. For example, if it takes 300 msec to drive a pixel from a full white state to a red yellow state or vice versa, the shaking waveform may consist of positive and negative pulses, each applied for not more than 150 msec. In practice, it is preferred that the pulses are shorter.

It is also noted that the lower voltage potential difference applied to reach the color states in FIGS. 2(c) and 2(d) may be about 5% to about 50% of the full driving voltage potential difference required to drive the pixel from the red state to the white state or from the white state to the red state.

While Example 2 demonstrates the possibility of a pixel exhibiting black, white, red, green or blue color state, the present invention also provides the possibility for a pixel to exhibit yellow, magenta or cyan color state.

Figures 2, 3, 4:
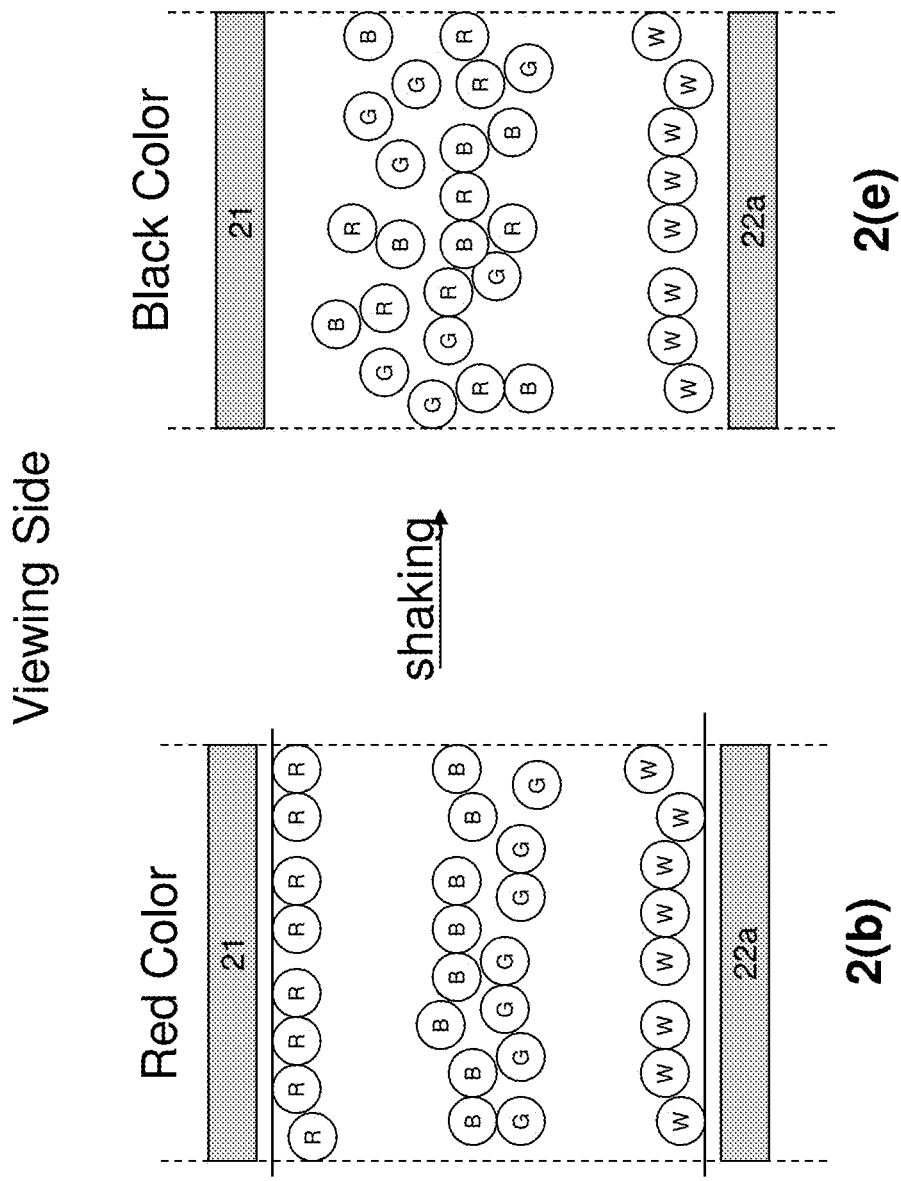
Figure 3:
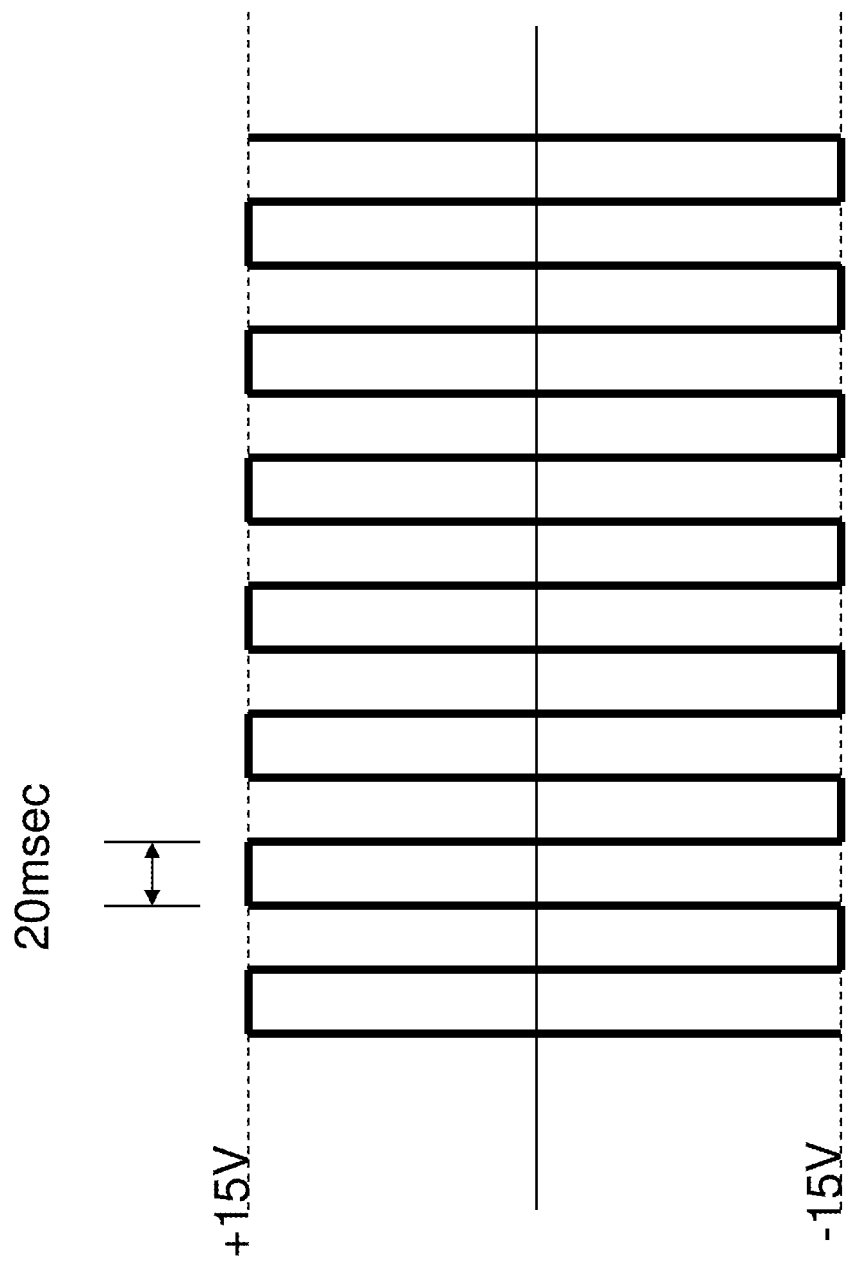

In FIG. 4, each pixel has two sub-pixels. In FIG. 4(a), a yellow state is displayed when one sub-pixel displays a red color and the other sub-pixel displays a green color. In FIG. 4(b), one sub-pixel displays a red color and the other sub-pixel displays a blue color, leading the pixel to display a magenta state. In FIG. 4(c), a pixel displays a cyan color state while one of the sub-pixels displays a blue color and the other sub-pixel displays a green color.

Figure 5:
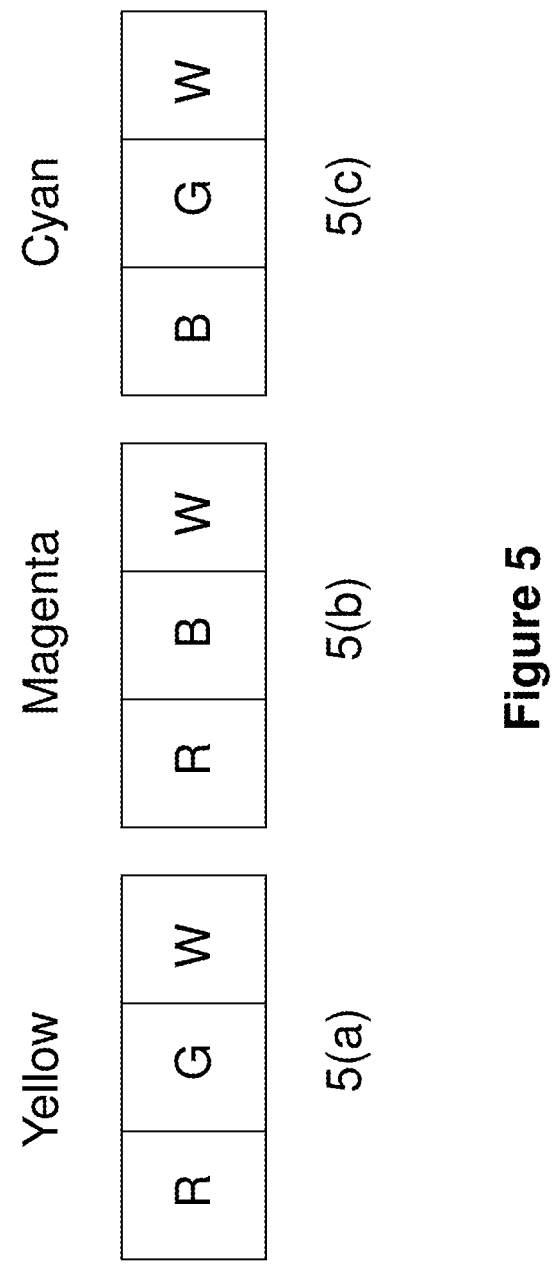

To display a brighter yellow, magenta or cyan color state, a pixel may consist of three sub-pixels. This is shown in FIG. 5 wherein a third sub-pixel is added, which third sub-pixel displays only the white color state.

EXAMPLE 2

Figures 2, 6:
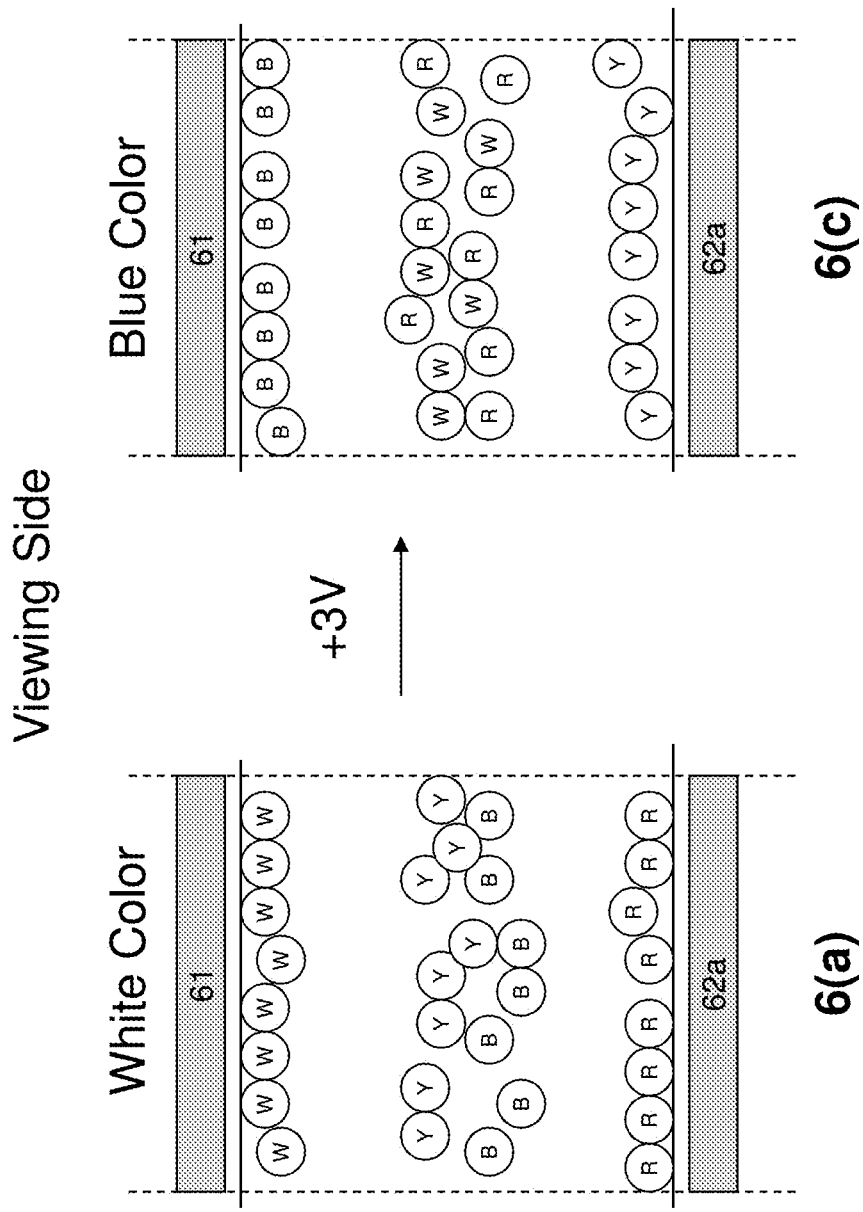
Figures 3, 6:
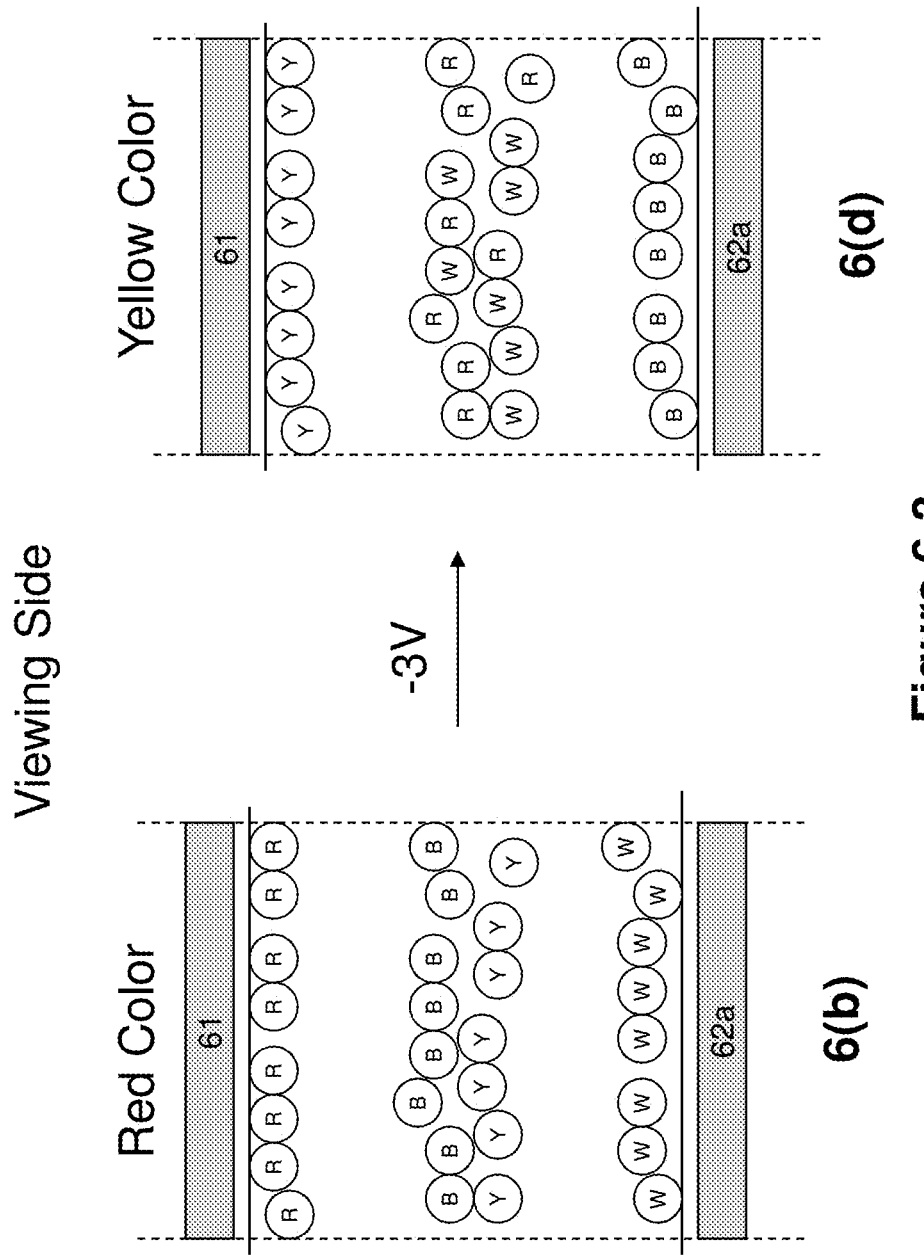
Figures 4, 6:
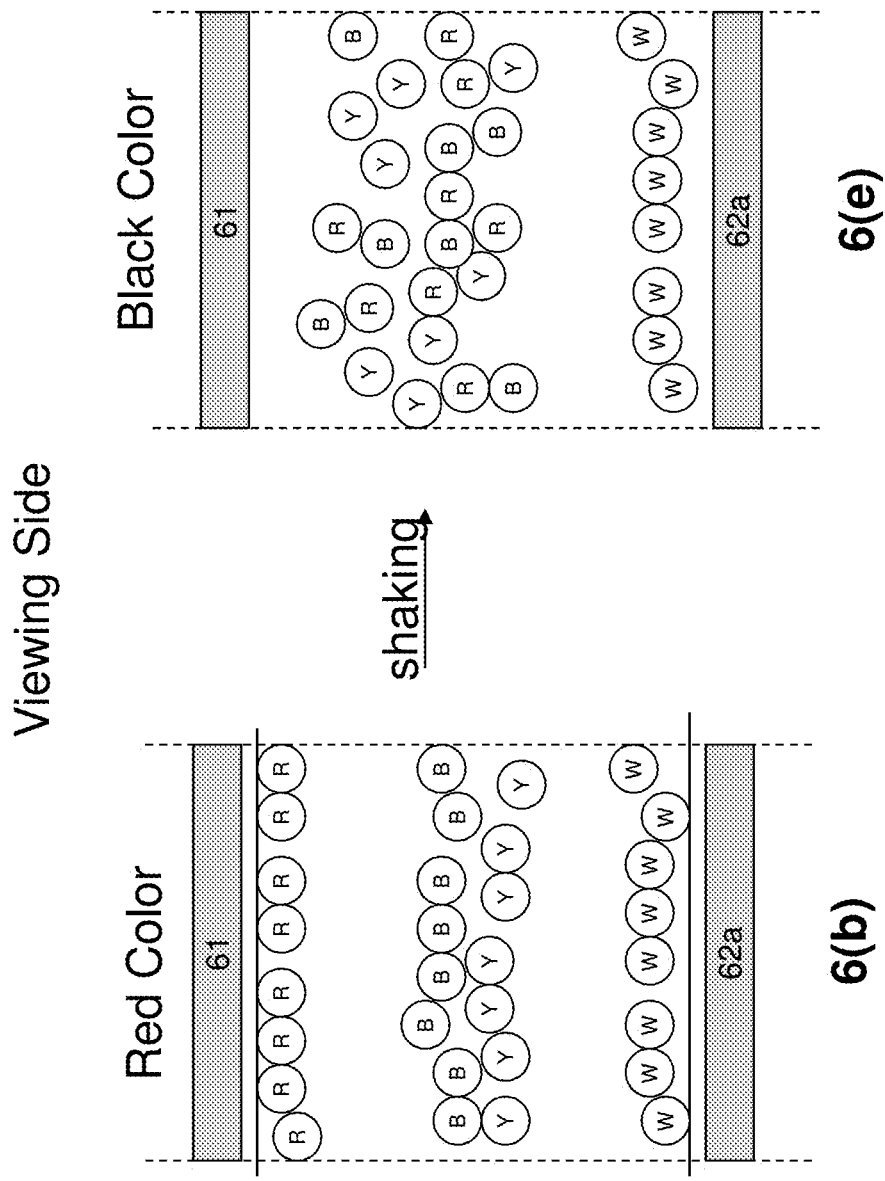

This example is demonstrated in FIG. 6. The fluid in this example has red, yellow, blue and white pigment particles. The red particles (R) carry a high positive charge, the white particles (W) carry a high negative charge, the blue (B) particles carry a low positive charge and the yellow particles (Y) carry a low negative charge.

In FIG. 6(a), when a high negative voltage potential difference (e.g., −15V) is applied to a pixel, the white particles (W) are pushed to the common electrode (61) side and the red particles (R) are pulled to the pixel electrode (62a) side. The blue (B) and yellow (Y) particles, due to their lower charge level, move slower than the higher charged white and red particles and therefore they stay in the middle of the pixel, with yellow particles above the blue particles. As a result, the white color is seen at the viewing side.

In FIG. 6(b), when a high positive voltage potential difference (e.g., +15V) is applied to the pixel, the particle distribution would be opposite of that shown in FIG. 6(a) and as a result, the red color is seen at the viewing side.

In FIG. 6(c), when a lower positive voltage potential difference (e.g., +3V) is applied to the pixel of FIG. 6(a) (that is, driven from the white state), the white particles (W) move towards the pixel electrode (62a) while the red particles (R) move towards the common electrode (61). When they meet while moving, because of their strong attraction to each other, they stop moving and remain in the middle of the pixel. In other words, the electric field generated by the low positive voltage potential difference is not strong enough to separate the white and red particles.

However, the electric field is strong enough to separate the lower charged blue and yellow particles and also strong enough to overcome the attraction forces between the oppositely charged high-low particle pairs (white/blue and red/yellow). As a result, the lower charged (positive) blue particles (B) move all the way to the common electrode (61) side (i.e., the viewing side) and the lower charged (negative) yellow particles (Y) move to the pixel electrode (62a) side. Consequently, the blue color is seen at the viewing side.

In FIG. 6(d), when a lower negative voltage potential difference (e.g., −3V) is applied to the pixel of FIG. 6(b) (that is, driven from the red state), the red particles (R) move towards the pixel electrode (62a) while the white particles (W) move towards the common electrode (61). When the white and red particles meet, because of their strong attraction to each other, they stop moving and remain in the middle of the pixel. In other words, the electric field generated by the low negative voltage potential difference is not strong enough to separate the white and red particles.

However, the electric field is strong enough to separate the lower charged blue and yellow particles and also strong enough to overcome the attraction forces between the oppositely charged high-low particle pairs (white/blue and red/yellow). As a result, the lower charged (negative) yellow particles (Y) move all the way to the common electrode side (i.e., the viewing side) and the lower charged (positive) blue particles (B) move to the pixel electrode side. Consequently, the yellow color is seen at the viewing side.

In FIG. 6(e), a black color is seen from the viewing side. This may be achieved by applying a shaking waveform when a pixel is in the red color state (seen in FIG. 6b), leading to the black color state to be seen at the viewing side.

Similarly as described in Example 2, the lower voltage potential difference applied to reach the color states in FIGS. 6(c) and 6(d) may be about 5% to about 50% of the full driving voltage potential difference required to drive the pixel from the red state to the white state or from the white state to the red state.

While Example 2 demonstrates the possibility of a pixel exhibiting black, white, red, yellow or blue color state, the present invention also provides the possibility for a pixel to exhibit purple, orange or green color state.

Figure 7:
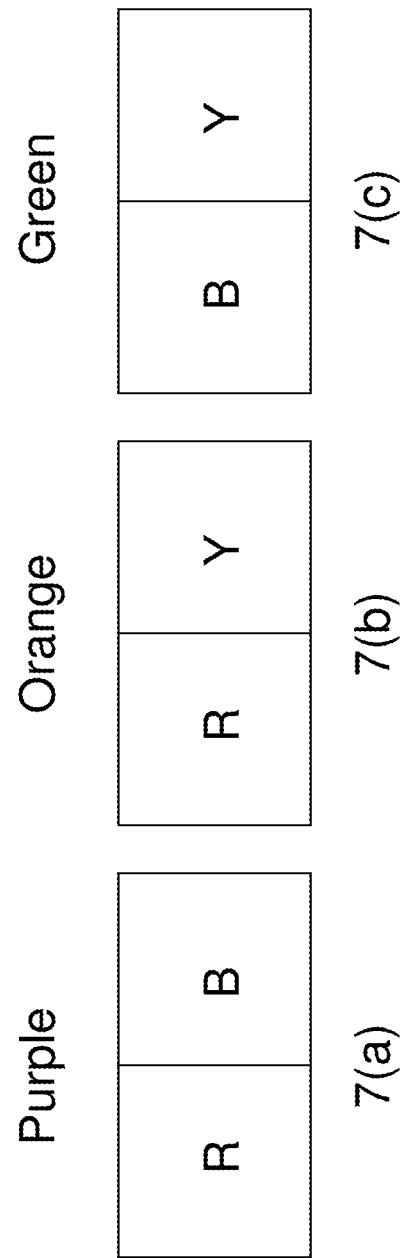
FIGS. 7 and 8 show how purple, orange and green color states may be displayed by a display device of FIG. 6.

In FIG. 7, each pixel has two sub-pixels. In FIG. 7(a), a purple state is displayed when one sub-pixel displays a red color and the other sub-pixel displays a blue color. Likewise, in FIG. 7(b), one sub-pixel displays a red color and the other sub-pixel displays a yellow color, leading the pixel to display an orange state. In FIG. 7(c), a pixel displays a green color state while one of the sub-pixels displays a blue color and the other sub-pixel displays a yellow color.

Figure 8:
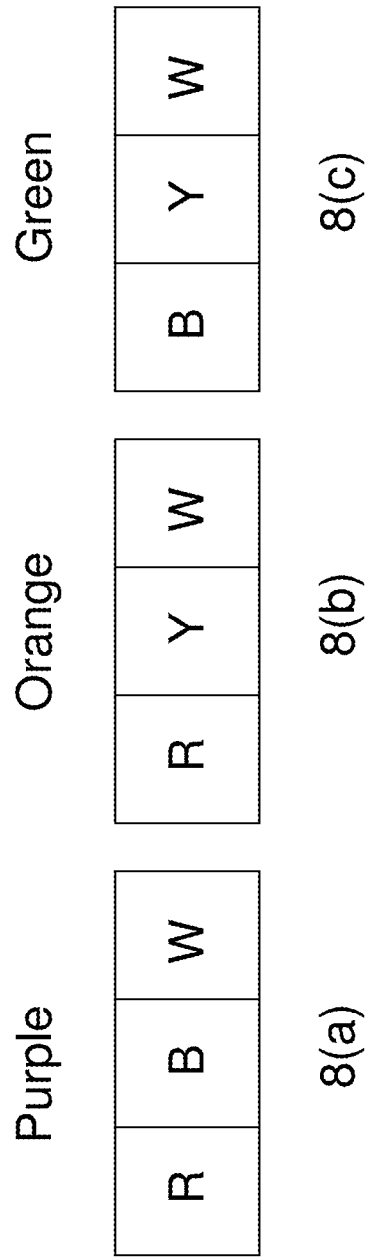

To display a brighter purple, orange or green color state, a pixel may consist of three sub-pixels. This is shown in FIG. 8 wherein a third sub-pixel is added, which third sub-pixel displays only the white color state.

Although in the two examples, particles of specific colors are demonstrated to be utilized, in practice as stated above, the particles carrying a high positive charge, or a high negative charge, or a low positive charge or a low negative charge may be of any colors. All of these variations are intended to be within the scope of this application. For example, the four types of particles may be cyan, magenta, yellow and white.

In a further aspect of the present invention, the fluid may further comprise substantially uncharged neutral buoyancy particles.

The term "substantially uncharged" refers to the particles which are either uncharged or carry a charge which is less than 5% of the average charge carried by the charged particles. In one embodiment, the neutral buoyancy particles are non-charged.

The term "neutral buoyancy" refers to particles which do not rise or fall with gravity. In other words, the particles would float in the fluid between the two electrode plates. In one embodiment, the density of the neutral buoyancy particles may be the same as the density of the solvent or solvent mixture in which they are dispersed.

The concentration of the substantially uncharged neutral buoyancy particles in the display fluid is preferably in the range of about 0.1 to about 10% by volume, more preferably in the range of about 0.1 to about 5% by volume.

The substantially uncharged neutral buoyancy particles may be formed from a polymeric material. The polymeric material may be a copolymer or a homopolymer.

Examples of the polymeric material for the substantially uncharged neutral buoyancy particles may include, but are not limited to, polyacrylate, polymethacrylate, polystyrene, polyaniline, polypyrrole, polyphenol and polysiloxane. Specific examples of the polymeric material may include, but are not limited to, poly(pentabromophenyl methacrylate), poly(2-vinylnapthalene), poly(naphthyl methacrylate), poly (alpha-methystyrene), poly(N-benzyl methacrylamide) and poly(benzyl methacrylate).

More preferably, the substantially uncharged neutral buoyancy particles are formed from a polymer which is not soluble in the solvent of the display fluid, and also has a high refractive index. In one embodiment, the refractive index of the substantially uncharged neutral buoyancy particles is different from that of the solvent or solvent mixture in which the particles are dispersed. However, typically the refractive index of the substantially uncharged neutral buoyancy particles is higher than that of the solvent or solvent mixture. In some cases, the refractive index of the substantially uncharged neutral buoyancy particles may be above 1.45.

In one embodiment, the materials for the substantially uncharged neutral buoyancy particles may comprise an aromatic moiety.

The substantially uncharged neutral buoyancy particles may be prepared from monomers through polymerization techniques, such as suspension polymerization, dispersion polymerization, seed polymerization, soap-free polymerization, emulsion polymerization or physical method, including inverse emulsification-evaporation process. The monomers are polymerized in the presence of a dispersant. The presence of the dispersant allows the polymer particles to be formed in a desired size range and the dispersant may also form a layer physically or chemically bonded to the surface of the polymer particles to prevent the particles from agglomeration.

The dispersant preferably has a long chain (of at least eight atoms), which may stabilize the polymer particles in a hydrocarbon solvent. Such dispersants may be an acrylate-terminated or vinyl-terminated macromolecule, which are suitable because the acrylate or vinyl group can co-polymerize with the monomer in the reaction medium.

One specific example of the dispersant is acrylate terminated polysiloxane (Gelest, MCR-M17, MCR-M22), Another type of suitable dispersants is polyethylene macromonomers, as shown below:

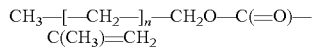

The backbone of the macromonomer may be a polyethylene chain and the integer "n" may be 30-200. The synthesis of this type of macromonomers may be found in Seigou Kawaguchi et al, Designed Monomers and Polymers, 2000, 3, 263.

If the fluid system is fluorinated, the dispersants are then preferably also fluorinated.

Alternatively, the substantially uncharged neutral buoyancy particles may also be formed from a core particle coated with a polymeric shell and the shell may be formed, for example, from any of the polymeric material identified above.

The core particle may be of an inorganic pigment such as $TiO_2$, $ZrO_2$, ZnO, $Al_2O_3$, CI pigment black 26 or 28 or the like (e.g., manganese ferrite black spinel or copper chromite black spinel), or an organic pigment such as phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher, or the like.

In the case of core-shell substantially uncharged neutral buoyancy particles, they may be formed by a microencapsulation method, such as coacervation, interfacial polycondensation, interfacial cross-linking, in-suit polymerization or matrix polymerization.

The size of the substantially uncharged neutral buoyancy particles is preferably in the range of about 100 nanometers to about 5 microns.

In one embodiment of this aspect of the present invention, the substantially uncharged neutral buoyancy particles added to the fluid may have a color substantially the same visually to the color of one of the four types of charged particles. For example, in a display fluid, there may be charged red, green, blue and white particles and substantially uncharged neutral buoyancy particles, and in this case, the substantially uncharged neutral buoyancy particles may be red, green, blue or white.

In another embodiment, the substantially uncharged neutral buoyancy particles may have a color substantially different from the color of either one of the four types of charged particles.

The presence of the substantially uncharged neutral buoyancy particles in the fluid increases reflection of incident light, thus also improving the contrast ratio, especially if they are formed from a reflective material.

The image stability may also be improved by the addition of the substantially uncharged neutral buoyancy particles in the four particle fluid system. The substantially uncharged neutral buoyancy particles can fill in the gaps resulted from the charged particles being over packed on the surface of an electrode under an electrical field, thus preventing the charged particles from settling due to the gravitational force.

In addition, if the substantially uncharged neutral buoyancy particles are white, they may enhance the reflectivity of the display. If they are black, they may enhance the blackness of the display.

In any case, the substantially uncharged neutral buoyancy particles do not affect the driving behavior of the four types of charged particles in the fluid.

The electrophoretic fluid as described above is filled in display cells. The display cells may be cup-like microcells as described in U.S. Pat. No. 6,930,818, the content of which is incorporated herein by reference in its entirety. The display cells may also be other types of micro-containers, such as microcapsules, microchannels or equivalents, regardless of their shapes or sizes. All of these are within the scope of the present application.

As shown in FIGS. 9A and 9B, the display cells (90), in the present invention, and the pixel electrodes (92a) may be aligned or un-aligned.

The term "about", throughout this application, is intended to mean ±5% of an indicated value.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. An electrophoretic display, comprising:
   (a) a plurality of pixels; and
   (b) an electrophoretic fluid comprising a first type of particles, a second type of particles, a third type of particles, and a fourth type of particles dispersed in a solvent or solvent mixture, wherein the first and second types of particles carry a high level of charge and are oppositely charged, the third and fourth types of particles carry a low level of charge and are oppositely charged, each of the pixels is capable of displaying at least five different color states, and the first and second type of particles are of the white and red colors, respectively.

2. The display of claim 1, wherein the third and fourth types of particles are of the blue and green colors, respectively.

3. The display of claim 2, each of the pixels is capable of displaying white, red, green, blue and black color states.

4. The display of claim 3, each of the pixels is capable of displaying yellow, magenta and cyan color states.

5. The display of claim 1, wherein the third and fourth types of particles are of the blue and yellow colors, respectively.

6. The display of claim 5, each of the pixels is capable of displaying white, red, yellow, blue and black color states.

7. The display of claim 6, each of the pixels is capable of displaying green, orange and purple color states.

8. An electrophoretic display, comprising:
   (a) a plurality of pixels; and
   (b) an electrophoretic fluid comprising a first type of particles, a second type of particles, a third type of particles, and a fourth type of particles dispersed in a solvent or solvent mixture, wherein the first and second types of particles carry a high level of charge and are oppositely charged, the third and fourth types of particles carry a low level of charge and are oppositely charged, each of the pixels is capable of displaying at least five different color states, and the four types of particles are red, green, blue and white particles, or the four types of particles are red, yellow, blue and white particles or the four types of particles are cyan, magenta, yellow and white particles.

9. The display of claim 8, wherein the low level of charge is less than about 50% of the high level of charge.

10. The display of claim 8, wherein the low level of charge is less than about 75% of the high level of charge.

11. An electrophoretic display, comprising:
    (a) a plurality of pixels; and
    (b) an electrophoretic fluid comprising a first type of particles, a second type of particles, a third type of particles, and a fourth type of particles dispersed in a solvent or solvent mixture, wherein the first and second types of particles carry a high level of charge and are oppositely charged, the third and fourth types of particles carry a low level of charge and are oppositely charged, each of the pixels is capable of displaying at least five different color states, and the electrophoretic fluid further comprises substantially uncharged neutral buoyancy particles.

12. The display of claim 11, wherein the substantially uncharged neutral buoyancy particles are non-charged.

13. A display layer comprising an electrophoretic fluid and having first and second surfaces on opposed sides thereof, the electrophoretic fluid comprising high positive particles, high negative particles, low positive particles and low negative particles, all dispersed in a solvent or solvent mixture, the four type of particles having respectively optical characteristics differing from one another, such that:
    (a) application of an electric field which has the same polarity as the high positive particles will cause a first optical characteristic of the high positive particles to be displayed at the first surface; or
    (b) application of an electric field which has the same polarity as high negative particles will cause a second optical characteristic of the high negative particles to be displayed at the first surface; or
    (c) once the optical characteristic of the high positive particles is displayed at the first surface, application of an electric field which has the same polarity as low negative particles, which is not strong enough to overcome the attraction force between the high positive particles and the high negative particles, but sufficient to overcome the attraction forces between other oppositely charged particles, will cause a third optical characteristic of the low negative particles to be displayed at the first surface; or
    (d) once the optical characteristic of the high negative particles is displayed at the first surface, application of an electric field which has the same polarity as the low positive particles, which is not strong enough to overcome the attraction force between the high positive particles and the high negative particles, but sufficient to overcome the attraction forces between other oppositely charged particles, will cause a forth optical characteristic of the low positive particles to be displayed at the first surface; or
    (e) application of a shaking waveform will cause a fifth optical characteristic to be displayed at the first surface,
    wherein the four types of particles are (i) red, green, blue and white particles, or (ii) red, yellow, blue and white particles, or (iii) cyan, magenta, yellow and white particles.

14. The layer of claim 13, wherein the four types of particles are red, green, blue and white particles.

15. The layer of claim 13, wherein the four types of particles are red, yellow, blue and white particles.

16. The layer of claim 13, wherein the four types of particles are cyan, magenta, yellow and white particles.

17. The layer of claim 13, wherein the charges of the lower charged particles are less than 50% of the charges of the higher charged particles.

18. The layer of claim 13, wherein the charges of the lower charged particles are less than 75% of the charges of the higher charged particles.

19. The layer of claim 13, wherein the fifth optical characteristic is a black color state.

* * * * *